United States Patent [19]
Johnston

[11] 4,163,398
[45] Aug. 7, 1979

[54] TRANSMISSION SHIFT CONTROL LOCK ASSEMBLY

[75] Inventor: James E. Johnston, Peoria, Ill.

[73] Assignee: Caterpillar Tractor Co., Peoria, Ill.

[21] Appl. No.: 878,125

[22] Filed: Feb. 9, 1978

[51] Int. Cl.² .................. G05G 5/06; B60K 28/00
[52] U.S. Cl. .................. 74/483 K; 74/529; 180/271
[58] Field of Search .......... 74/483 K, 529; 180/82 A; 192/4 A, 4 B

[56] References Cited
U.S. PATENT DOCUMENTS

| | | | |
|---|---|---|---|
| 3,301,086 | 1/1967 | Williams et al. | 74/529 X |
| 3,480,120 | 11/1969 | Lenzen et al. | 192/4 |
| 3,523,588 | 8/1970 | Bradshaw | 180/112 |
| 3,710,904 | 1/1973 | Boyer | 74/529 |
| 3,811,020 | 5/1974 | Johnson et al. | 180/82 A X |
| 4,069,900 | 1/1978 | Stamate | 180/82 A X |

Primary Examiner—Allan D. Herrmann
Attorney, Agent, or Firm—John W. Grant

[57] ABSTRACT

A transmission shift control has a member movable in an arcuate pathway between forward and reverse drive positions and through a neutral position intermediate the forward and reverse drive positions. A pair of levers are positioned on opposite sides of the member and are movable to a position for embracing the member and maintaining the member at the neutral position.

7 Claims, 5 Drawing Figures

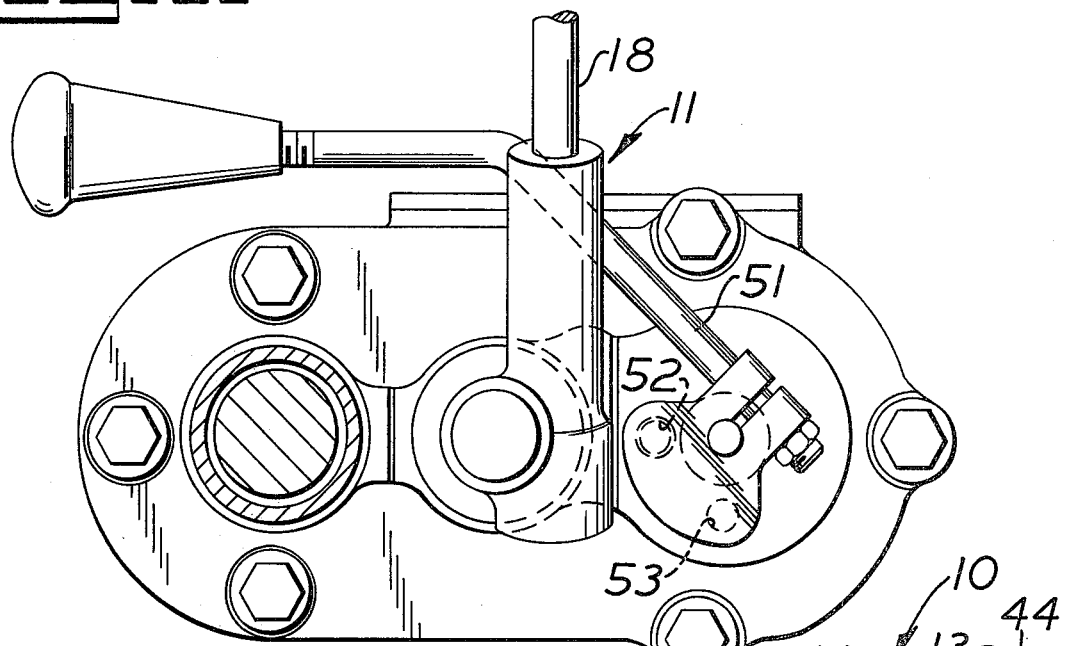
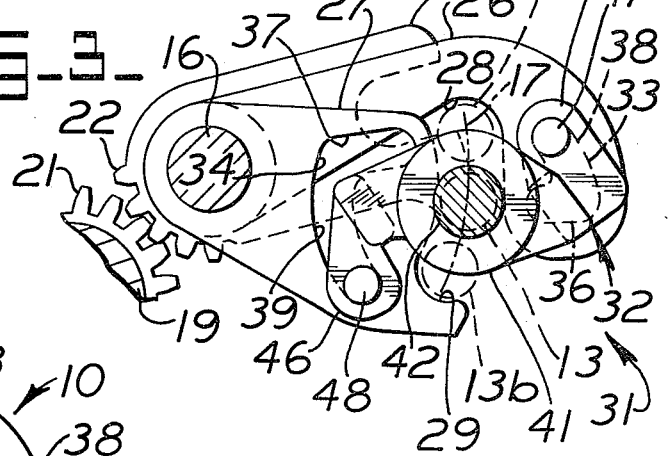
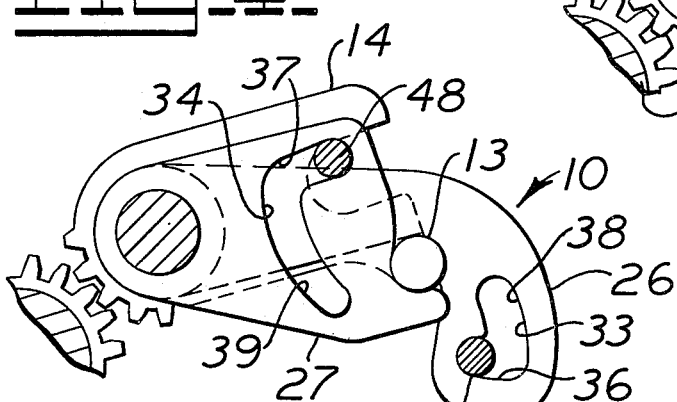
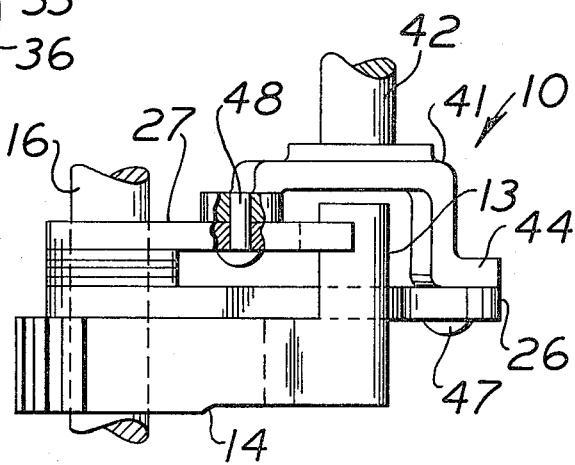

TRANSMISSION SHIFT CONTROL LOCK ASSEMBLY

BACKGROUND OF THE INVENTION

This invention relates to a lock assembly for moving and/or maintaining a transmission shift control at a neutral position.

Many vehicles have a transmission neutralizing apparatus for locking the transmission shift control in the neutral position. Such apparatus commonly have the capability of mechanically shifting the transmission shift control to the neutral position from any of the operating positions when the apparatus is manipulated to the lock position. Those apparatus are commonly positioned within an open area of the vehicle and have at least one of the movable elements extending through a slot in a case in which the apparatus is mounted.

Although those apparatus effectively move and lock the transmission shift control in the neutral position, one of the problems encountered therewith is that, owing to their particular construction, they cannot be readily adapted to a sealed environment.

It is desirable to enclose the apparatus within a sealed case containing the transmission shift control to prevent the infiltration of dust and grit into the case. This is more important in transmission shift control arrangements in which the transmission shift control is connected to the transmission through push-pull cables. Such push-pull cables have a tendency to stick when the slide cable becomes contaminated with dirt or grit. Sticking of the slide cable makes the transmission shift control difficult to shift and might possibly cause the transmission to stick and be maintained in a drive position. Further, under some conditions moisture collects on the slide cable and freezes overnight causing the cable to seize in neutral.

SUMMARY OF THE INVENTION

The present invention is directed to overcoming one or more of the problems as set forth above.

According to the present invention, a transmission shift control lock assembly for locking a transmission shift control in a neutral position has first and second levers positioned on opposite sides of a member of the transmission shift control. The first and second levers are movable between a first lever position at which the member is free to move between forward and reverse drive positions and a second lever position at which the member is embraced by the levers and maintained at a neutral position. A means is provided for moving the first and second levers between the first and second lever positions.

BRIEF DESCRIPTION OF THE DRAWINGS

FIG. 2 is a plan view taken along line II—II of FIG. 1.

FIG. 3 is an enlarged diagrammatic view taken along line III—III of FIG. 1 showing certain elements in an unlocked position.

FIG. 4 is a diagrammatic view similar to FIG. 3 showing certain elements in a locked position.

FIG. 5 is a diagrammatic side elevational view of the elements illustrated in FIG. 3.

DETAILED DESCRIPTION

Figure 1:
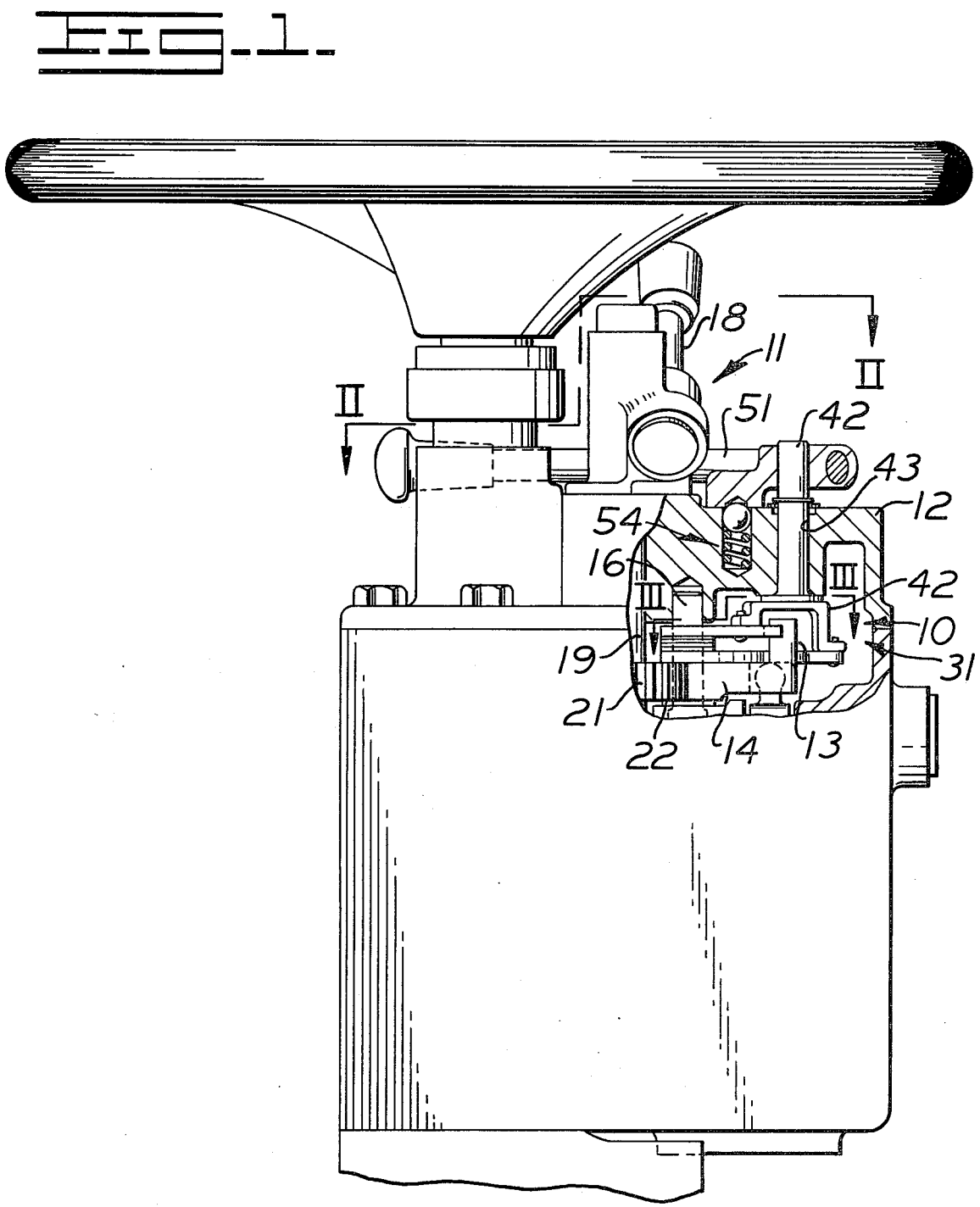
FIG. 1 is a diagrammatic view partially in section of a transmission shift control lock assembly of the present invention.

Referring to FIG. 1 of the drawings, a transmission shift control lock assembly is generally indicated by the reference numeral 10 for moving and/or maintaining a transmission shift control 11 in a neutral position. As used herein, the term "transmission shift control" includes all components connecting the shift lever to the transmission. As in heretofore utilized transmission shift controls, the control 11 has a support structure 12 in the form of a housing or case and a member 13 connected to the support structure through a lever 14. The member 13 extends upwardly from the lever 14 which is pivoted on a pivot pin 16 connected to the support structure. The member 13 is movable in an arcuate pathway indicated at 17 in FIG. 3 between first and second positions 13a, 13b in unison with lever 14 and has an intermediate position therebetween. The lever 14 is connected to the transmission through a suitable linkage and for an understanding of the present invention, it will suffice to note that the first and second positions of the member 13 correspond to forward and reverse drive conditions, respectively, of the transmission while the intermediate position corresponds to the transmission being in neutral. Rotation of lever 14 is accomplished through a shift lever 18 connected to a rotatable shaft 19 having a sector gear 21 provided thereon and which meshes with a sector gear 22 integrally formed on lever 14.

The lock assembly 10 includes first and second levers 26, 27 which are pivotally connected to the housing 12 by the pivot pin 16 so that lever 14 and the first and second levers 26, 27 pivot about a common pivot. The first and second levers are positioned on opposite sides of member 13 and are movable between a first lever position at which member 13 is free to move along the arcuate pathway 17 between the first and second positions 13a, 13b and a second lever position at which member 13 is embraced by and maintained at the intermediate position by the first and second levers. The first and second levers are so constructed and adapted for moving member 13 from the first and second positions, respectively, to its intermediate position in response to the first and second levers being moved from the first lever position to the second lever position. The first lever 26 has a surface portion 28 for contact with member 13. Similarly, a surface 29 is provided on the second lever for contact with member 13.

A means 31 is provided for moving the first and second levers 26, 27 between their first and second lever position.

The means 31 can be, for example, an actuating assembly 32 and first and second slots 33, 34 in the first and second levers 26, 27, respectively. The slots 33, 34 have camming slot portions 36, 37 and free motion slot portions 38, 39.

The actuating assembly 32 includes a crank 41 having a shaft 42 extending through a bore 43 in the housing 12 and is rotatable therein such that the crank is rotatably connected to the housing. The shaft 42 is positioned substantially perpendicular to the planes in which the first and second levers move. The crank has first and second arms 44, 46 positioned adjacent the first and second slots 33, 34, respectively. First and second pins, 47, 48 are connected to the first and second arms 44, 46, respectively, and extend through the respective first or second slots 33, 34 for connecting the crank to the first and second levers 26, 27. The pins 47, 48 are positioned substantially diametrically opposite one another and move in arcuate pathways in response to rotation of the crank 41.

An actuating or third lever 51 is connected to the distal end of the shaft 42 and is movable between first and second positions for moving the crank 41 between first and second crank positions. At the first position of the crank the first and second levers 26, 27 are at the first lever position. At the second position of the crank, the first and second levers are at the second lever position.

A pair of recesses 52, 53 are provided in the actuating lever 51 and are elements of a detent means 54 for resiliently maintaining the actuating lever at its first and second lever positions.

The centerline of the shaft 42 as shown in the drawings passes through the arcuate pathway 17 of member 13. However, this relationship is not critical to the invention, and once location of pivot pin 16 has been selected relative to the arcuate pathway, one skilled in the art can readily form suitable slots 33, 34 in the levers for achieving movement of the first and second levers between their first and second lever positions.

OPERATION

In operation, when first and second levers 26, 27 are in their first position as shown in FIG. 3, member 13 and hence lever 14 is free to move between its first and second positions so that the transmission can be shifted between forward, neutral and reverse drive conditions. To lock the transmission shift control 11 in the neutral position, the operator rotates the actuating lever 51 clockwise as viewed in FIG. 2 from the position shown in FIG. 2. This rotates the crank 41 and thus causes the pins 47, 48 extending into the slots 33, 34 to be moved in arcuate pathways. Initially, the pins merely move within the free motion portions 38, 39 of the slots with no resulting movement of the first and second levers 26, 27. The pins eventually engage the camming slot portions 36, 37 and thereby move the first and second levers in scissor-like fashion from the first lever position shown in FIG. 3 to the second lever position as shown in FIG. 4.

Should the member 13 be in its first position prior to rotation of the actuating lever 51, the first lever 26 will move the member to the intermediate or neutral position. Conversely, should the member be in the second position, the second lever 27 will move the member to the intermediate or neutral position. The actuating lever 51 is held in its second position by the detent means 54 and thus member 13 is embraced by and held in the intermediate position by the first and second levers. Thus, the transmission shift control 11 is held in the neutral position so that the transmission cannot be shifted to a drive condition.

To unlock the transmission shift control, the operator rotates actuating lever 51 counterclockwise from its second position to its first position. The actuating lever in turn rotates the crank 41 to its first position thereby moving the first and second levers 26, 27 from their second position to their first position.

As noted above, the first and second levers 26, 27 are moved from their first position to their second position only during the latter part of the movement of the actuating lever 51. Thus, in some cases, one or both of the free motion slot portions 38, 39 can be deleted without departing from the invention. The free motion slot portions are provided so that the actuating lever 51 can be rotated a preselected arcuate distance which in the present case is about 90°.

Also, in some transmission shift control arrangements, the neutral position of the member 13 may be closer to one of the surfaces 28, 29 than to the other. In such arrangements, the length of both camming slot portions 36, 37 and both free motion slot portions 38, 39 will be altered accordingly.

In view of the foregoing, it is readily apparent that the structure of the present invention provides an improved transmission shift control lock assembly for moving and/or maintaining a member of the transmission shift control in a neutral position. Since the lock assembly is actuated by rotation of a shaft extending through a bore in the housing containing the transmission shift control, the housing can be readily sealed to prevent infiltration of dust grit, and moisture into the housing.

Other aspects, objects and advantages of this invention can be obtained from a study of the drawings, the disclosure, and the appended claims.

The embodiments of the invention in which an exclusive property or privilege is claimed are defined as follows:

1. A transmission shift control lock assembly for a transmission shift control having a support structure and a member pivotally connected to the support structure, said member being movable in an arcuate pathway between first and second positions at which the transmission is in forward and reverse drive conditions respectively, said member having an intermediate position at which the transmission is in neutral, comprising:

first and second levers pivotally connected to the support structure and positioned on opposite sides of said member, said levers being movable between a first lever position at which the member is free to move between said first and second positions and a second lever position at which the levers are contacting and maintaining the member at said intermediate position; and means for moving said first and second levers between said first and second lever positions.

2. The lock assembly of claim 1 wherein said means includes a crank rotatably connected to the support structure and connected to the first and second levers, said crank being rotatable between a first crank position at which the first and second levers are at the first lever position and a second crank position at which the first and second levers are at the second lever position.

3. The lock assembly of claim 2 wherein each of said levers has a camming slot therein and including a pair of pins connected to the crank and individually extending through the camming slots.

4. The lock assembly of claim 3 wherein one of said first and second levers has a free motion slot interconnected to the camming slot therein.

5. The lock assembly of claim 2 wherein said means includes a third lever connected to said crank and being movable between first and second positions.

6. The lock assembly of claim 5 including detent means for resiliently maintaining said third lever at said first and second positions.

7. The lock assembly of claim 1 wherein said first and second levers are so constructed and adapted for moving said member from the respective first and second positions to the intermediate position in response to movement of the first and second levers from the first lever position to the second lever positions.

* * * * *